(12) United States Patent
Yasukohchi et al.

(10) Patent No.: US 6,278,837 B1
(45) Date of Patent: Aug. 21, 2001

(54) MULTICHANNEL RECORDING AND REPRODUCING APPARATUS

(75) Inventors: Ryuji Yasukohchi, Funabashi; Akio Uesugi, Tokyo; Masaki Satoh, Tokyo; Noriko Tanaka, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/092,972

(22) Filed: Jun. 8, 1998

(30) Foreign Application Priority Data

Jun. 10, 1997 (JP) .................................... 9-151783
Mar. 13, 1998 (JP) ................................. 10-062787

(51) Int. Cl.[7] .............................. H04N 5/91; H04N 7/04; H04N 7/06; H04N 7/08; H04N 7/52
(52) U.S. Cl. .......................... 386/108; 386/122; 386/124
(58) Field of Search ................................. 386/36, 40, 92, 386/122, 124, 108

(56) References Cited

U.S. PATENT DOCUMENTS

| | | |
|---|---|---|
| 4,943,854 | 7/1990 | Shiota et al. . |
| 5,355,353 | 10/1994 | Kaiho . |
| 5,371,551 * | 12/1994 | Logan et al. .......................... 386/112 |
| 5,371,602 | 12/1994 | Tsuboi et al. . |
| 5,625,846 * | 4/1997 | Kobayakawa et al. ................. 710/52 |
| 5,719,985 * | 2/1998 | Ito et al. ............................... 386/109 |
| 5,870,497 * | 2/1999 | Galbi et al. ........................... 382/232 |
| 6,091,883 | 7/2000 | Artigalas et al. . |

FOREIGN PATENT DOCUMENTS 0 753 964   1/1997  (EP) .

* cited by examiner

Primary Examiner—Wendy R. Garber
Assistant Examiner—Po-lin Chieu
(74) Attorney, Agent, or Firm—Lowe Hauptman Gilman & Berner, LLP (57) ABSTRACT

A multichannel recording and reproducing apparatus which includes: an input and output circuit; a buffer for temporally storing multichannel of video data through inputting and outputting circuit; a disc unit for storing the video data; a disc interface; a user interface circuit for receiving recording and reproducing commands and a corresponding file name from a user; a control circuit responsive to the user interface for obtaining one of N video channel circuits of the input and output circuit for inputting and outputting video data and receiving recording and reproducing commands; a filing circuit controlling files and determining first and second address data of the disc unit according to the recording and reproducing commands respectively; an access control circuit for accumulating the recording and reproducing commands and supplying each of the accumulated recording and reproducing commands when the disc interface is in a non-operating condition with priority provided to either of the recording or reproducing command according to priority data. The inputting and outputting circuit may includes a digital satellite broadcasted video data receiver and a separater for separating the multiplexed digital satellite broadcasted video data into a plurality of sets of digital video data.

6 Claims, 9 Drawing Sheets

BLOCK MANAGEMENT TABLE

| BLOCK NO. | SEGMENT POS (OFFSET) | THE NO. OF SEGMENTS | TOP FRAGMENT FLG |
|---|---|---|---|
| 0 | 0 | 1 | 1 |
| 1 | OFFSET 1 | 1 | 0 |
| 2 | OFFSET 2 | 3 | 0 |
| 3 | 0 | 0 | 0 |
| n | 0 | 1 | 1 |
| n+1 | OFFSET n+1 | 1 | 0 |
| N | | | |

FIG. 5B

FRAGMENT MANAGEMENT TABLE

| INDEX | TOP BLOCK NO. | THE NO. OF SEGMENTS | THE NO. OF BLOCKS | LINKAGE RELATION WITH NEXT FRAGMENT |
|---|---|---|---|---|
| 1 | 0 | 5 | 4 | 3 |
| 2 | | | | |
| 3 | n | 2 | 3 | FFFF |
| N | | | | |

FIG. 5C

FILE MANAGEMENT TABLE

| FILE ID | FRAGMENT MANAGEMENT TABLE INDEX |
|---|---|
| 0 | |
| 1 | 1 |
| 2 | |
| 3 | |
| N | |

FIG. 5D

BLOCK BIT MAP

| 1 | 1 | 1 | 1 | | | | |
|---|---|---|---|---|---|---|---|
| | | | | | | | |
| | | | | | | | |
| | | | | 1 | 1 | 1 | |
| | | | | | | | |
| | | | | | | | |

FIG. 5E

FRAGMENT BIT MAP

| 0 | 1 | 1 | |
|---|---|---|---|
| | | | |
| | | | |
| | | | |
| | | | |
| | | | |

MULTICHANNEL RECORDING AND REPRODUCING APPARATUS

BACKGROUND OF THE INVENTION

1. Field of the Invention

This invention relates to a recording and reproducing apparatus for recording and reproducing video data.

2. Description of the Prior Art

A multichannel recording and reproducing apparatus for recording multichannel video data on a VTR through multiplexing data and reproducing video data is known. Such a prior art video surveillance system is disclosed in U.S. Pat. No. 4,943,854.

SUMMARY OF THE INVENTION

The aim of the present invention is to provide an improved multichannel recording and reproducing apparatus.

According to the present invention, a multichannel recording and reproducing apparatus is provided, which includes: an inputting and outputting circuit including N video channel circuits for inputting and outputting N video data, N being a natural number; N data buffers for temporally storing the N video data from the N video channel circuits respectively; a disc unit for receiving one channel of the N video data and storing the N video data; a memory interface; a user interface for receiving request channel data indicative of the use of one of the N video channel circuits, a recording command and a reproducing command, and a corresponding file name from a user; a control circuit for operating one of the N video channel circuits in accordance with the request channel data and outputting the recording command, a reproducing command, the corresponding file name, and the request channel data from the user interface means; a filing circuit including a table for determining first address data corresponding to the file name from the control circuit in response to the recording command from the control circuit and storing a relation between the file name from the control means and the first address in the table to form a file and for determining second address data of the disc unit using the file name from the control circuit and the stored relation in response to the reproducing command data; and an access control circuit for accumulating the recording command and reproducing command, detecting an operation condition of the memory interface, and successively supplying each of the accumulated recording command and reproducing command when the interface means is in a non-operating condition with priority provided to either of the recording command or reproducing command in accordance with priority data, wherein the memory interface stores one of the N video data from the data buffer in the disc unit in response to the recording command, the first address data from the access control circuit, and the request channel data from the control circuit and reads and stores video data from the disc unit in one of the N data buffers in response to the reading command from the access control circuit, the second address data from the access control circuit, and the request channel data from the control circuit to output the video data from the disc unit through the inputting and outputting circuit.

In the multichannel recording and reproducing apparatus, the filing circuit may form the file indicating fragments of the memory, each fragment including successive segments, each segment storing one frame of the video data and has a table storing the first address of each of the fragments and each of the segments and a relation of between the file name and the fragments and a link relation of the fragments.

In this case, the user interface may further receive an endless recording command and a successively recording command and the filing circuit determines the first address in response to the endless recording command such that the video data recurrently is overwritten at a predetermined number of the fragments and the filling circuit determines the first address such that the video data successively recorded in response to the successively recording command.

The multichannel recording and reproducing apparatus may further include a synchronizing signal generation circuit for generating and supplying a plurality of vertical synchronizing signals of which phases are different each other, wherein the N video channel circuits are responsive to a plurality of vertical synchronizing signals respectively.

In the multichannel recording and reproducing apparatus, the user interface may include a plurality of terminals and the control circuit assigns one of the N video channel circuits to one of a plurality of the terminals in response to the request channel data so that one of the N video channel circuits is independently controlled by the each of a plurality of the terminals.

In the multichannel recording and reproducing apparatus, the inputting and outputting circuit may include a digital satellite broadcast data receiving circuit for receiving a digital satellite broadcasted data including multiplexed plurality of channels of video data and a separation circuit for separating the digital satellite broadcasted data into a plurality of channels of video data and storing the plurality of the channels of video data in the data buffer at different storing areas.

BRIEF DESCRIPTION OF THE DRAWINGS

The object and features of the present invention will become more readily apparent from the following detailed description taken In conjunction with the accompanying drawings in which.

The same or corresponding elements or parts are designated with like references throughout the drawings.

DETAILED DESCRIPTION OF THE INVENTION (First Embodiment)

Figure 1:
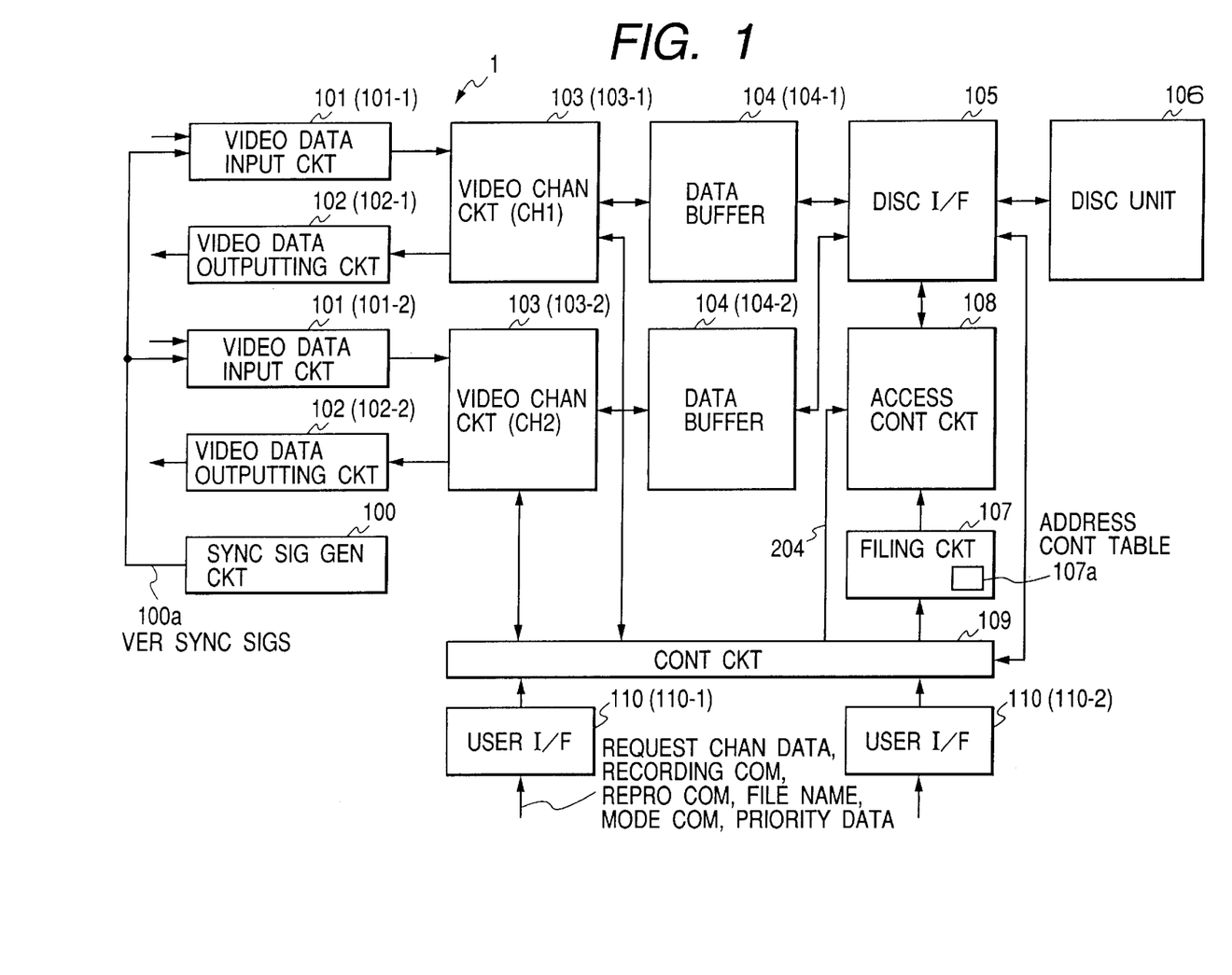
FIG. 1 is a block diagram of a multichannel recording and reproducing apparatus of a first embodiment.

FIG. 1 is a block diagram of a multichannel recording and reproducing apparatus of a first embodiment.

The multichannel recording and reproducing apparatus of the first embodiment includes: a video data inputting and outputting circuit 1 including a plurality of video data input circuits 101-1 and 101-2, video data outputting circuits 102-1 and 102-2, and video channel circuits 103-1 and 103-2, data buffers 104-1 and 104-2 for storing video data from the video data inputting and outputting circuit 1, and a synchronizing signal generation circuit 100 for generating and supplying synchronizing signals to the video data input circuits 101-1 and 101-2 respectively, a disc unit 106 for storing the video data, a disc interface 105 for transmitting the video data between the data buffers 104-1 and 104-2 and the disc unit 106, a user interface circuits 110-1 and 110-2 for receiving request channel data indicative of using one of the video data input circuits 101 or one of the video data outputting circuits 102, a recording command and a reproducing command, a file name, a mode command, priority data from a user, a control circuit 109 for controlling the receiving and outputting circuit 1 and receiving and outputting the recording command and the reproducing command from the user interfaces 110-1 and 110-2, a filing circuit 107 including an address control table 107a for forming a file of the video data in the disc unit 106 by determining the first address of the disc unit 106 for recording the video data from the data buffer 104-1 or 104-2 in response to the recording command and for determining a second address of the disc unit 106 for reading the video data from the recording circuit using an access control circuit 108 and the disc interface 105 in response to reproducing command data, the access control circuit 108 for supplying the recording command and reproducing command and the first and second address to the disc interface 105 in accordance with the priority data 204.

The video data input circuits 101-1 and 101-2 input video signals in response to synchronizing signals from the synchronizing signal generation circuit 100 respectively. The synchronizing signals from the synchronizing signal generation circuit 100 have a phase difference each other. The video channel circuits 103 process the video signals from the video data input circuits 101-1 and 101-2 respectively and supply the processed video data to the data buffers 104-1 and 104-2 respectively. That is, each video channel circuit 103 converts the video signal to video data and data-compresses the video data. The data buffers 104-1 and 104-2 temporally stores video data from the video channel circuits 103 every frame of the video data. The disc interface 105 stores either of the video data from the data buffer 104-1 and 104-2 through the disc interface 105 under the control by the access control circuit 108. If there are record commands for recording the video data from both video dat input circuits 101-1 and 101-2, the disc interface 105 stores both video data in a time-division operation.

Each of the user interfaces 110-1 and 110-2 receives the request channel data indicative of a desired channel, the recording command, the reproducing command and the corresponding file name, a mode command, and priority data from a user.

The control circuit 109 responsive to the user interfaces 110-1 and 110-2 controls the inputting and outputting circuit 1, that is, the control circuit 109 obtains one of the video channel circuits 103 in response to the request channel data and receives and supplies the recording command to the filing circuit 107.

More specifically, in response to the request channel data from the user interface 110, the control circuit 109 checks the operation condition of the desired one of the video channel circuit 103 and when the desired one of video channel circuit 103 is not used, the control circuit 109 assigns the desired one of video channel circuits 103 to the user interface circuit 110. Alternatively, the control circuit 109 may have a memory (not shown) for storing the operational conditions of the video channel circuits 103-1 and 103-2 and checks the data of the operational conditions of the video channel circuits 103-1 and 103-2.

Then, the control circuit 109 activates a data compression circuit (not shown) in the video channel circuit of the desired channel and detects whether the data compression and storing the compressed data in the data buffer 104 has completed. When the data compression and storing the compressed data in the data buffer 104 has completed, the control circuit supplies the recording and reproducing commands and the file name to the filing circuit 107.

Moreover, the control circuit 109 supplies priority data 204 to the access control circuit 108 in response to the user interface circuit 110 and the request channel data to the disc interface 105.

The filing circuit 107 includes an address control table 107a and determines first address data corresponding to the file name from the user interface 110 in response to the recording command data and stores a relation therebetween in the address control table 107a to form a file.

The access control circuit 108 holds or accumulates the recording commands and reproducing commands from the user interface 110-1 and 110-2, detects an operation condition of the disc interface 105, and supplies each of the accumulated recording command data when the disc interface 105 is in a non-operating condition with priority provided to either of the recording command data or the reproducing command data in accordance with priority data 204. The disc interface 105 stores one channel of the video data from the data buffer 104 indicated by the request channel data in response to the recording command data and the first address data from the access control circuit 108.

In the above-mentioned operation, the disc interface 105 stores and reads the multichannel video data in a time-division operation. This operation is repeated to store successive images.

A reproducing operation will be described.

When the reproducing command is inputted to the user interface 110, the control circuit 109 controls the inputting and outputting circuit and receives and supplies reproducing command to the filing circuit 107. That is, in response to the reproducing command the control circuit 109 checks the operation condition of the desired one of the video channel circuits 103 and when the desired channel is not used, the control circuit 109 assigns the desired video channel circuit 103 to the user interface circuit 110 and supplies the reproducing command and the file name to the filing circuit 107.

The filing circuit 107 determines second address data corresponding to the file name from the user interface 110 in response to the reproducing command referring to the address control table 107a.

The access control circuit 108 holds or accumulates the reproducing command data from the user interface 110, detects an operation condition of the disc interface 105, and supplies each of the reproducing commands and second address data when the disc interface 105 is in a non-operating condition.

The disc interface 105 reads and stores the video data from the disc unit 106 in the data buffer 104 indicated by the request channel data in response to the reproducing command and the second address data from the access control circuit 108. The data buffer 104 temporally stores the video data from the disc unit 106. The video channel circuit 103 time-expands the video data from the data buffer and supplies a frame of the video data outputting circuit 102 through the video channel circuit 103. The control circuit 109 detects whether storing the video data from the disc unit 106 has completed. If storing the video data from the disc unit 106 has completed, the control circuit 109 operates the video channel circuit indicated by the request channel data to reproduce the video data from the data buffer 104. This operation is repeated to reproduce successive images.

The operation will be described more concretely.

Assuming the video channel circuit 103-1 is used from the request from the user interface circuit 110-1.

When the user interface 110-1 receives the request channel data for using the desired video channel circuit 103-1, the recording command, and the corresponding file name, the user interface 110-1 sends them to the control circuit 109. The control circuit 109 checks the operation condition of the video channel circuit 103-1 and when the video channel circuit 103-1 is not used, the control circuit 109 permits using the video channel circuit 103-1, that is, the control circuit 109 assigns the video channel circuit 103-1 to the user interface 110-1 and activates a data compression circuit (not shown) of the video channel circuit 103-1. In response to this, the video channel circuit 103-1 data-compresses the video signal from the video data input circuit 101-1 and stores the compressed data in the data buffer 104-1 and when the data compression and storing the compressed data in the data buffer 104-1 has completed, the control circuit 109 informs the filing circuit 107 of the completion of storing the compressed data.

In response to this, the filing circuit 107 determines the first address of the disc unit 106 to store a frame of the video data from the data buffer 104-1 and supplies the first address, the recording command to the access control circuit 108 and renews the address control table 107a of the filing circuit 107.

Figure 2:
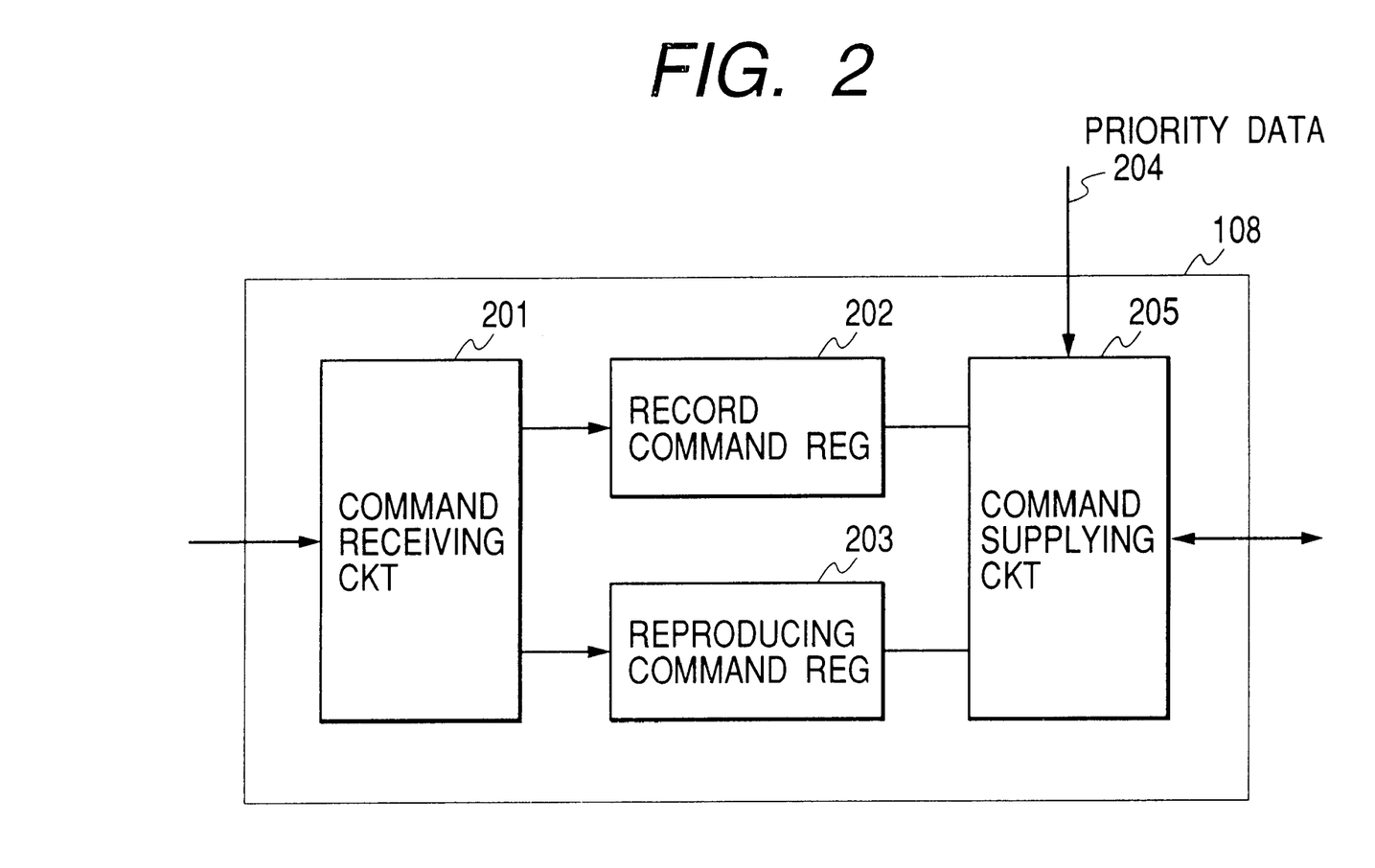
FIG. 2 is a block diagram of the access control circuit shown in FIG. 1.

FIG. 2 is a block diagram of the access control circuit 108 shown in FIG. 1.

The access control circuit 108 includes a command receiving circuit 201, a recording command register 202, reproducing command register 203, and a command supplying circuit 205. The command receiving circuit 201 receives the first and second addresses and the recording and reproducing commands and supplies the recording command and first address to the record command register 202 and supplies the reproducing command and the second address to the reproducing command register 203. The record command registers 202 accumulates the recording command and the first address data and the reproducing command registers 203 accumulates the reproducing command and the second address data. The command supplying circuit 205 checks the operation condition of the disc interface 105 and supplies the first address data and one of the recording command firstly accumulated when the disc interface 105 is in a non-operating condition. In response to this the disc interface 105 stores a frame of the video data stored in the data buffer 104-1 in the disc unit 106 with the first address from the access control circuit 108. If there is still the accumulated recording command in the record command register 202, the disc interface continues storing the video data until there is no recording command data in the recording command register 202. If there is also reproducing command in the reproducing command register 203, recording is effected with priority to the reading command.

An operation when reproducing is effected using the video channel circuit 103-2 in response to a reproducing request from the user interface circuit 110-2 will be described.

When the user interface 110-2 receives the request for reproducing using the desired video channel circuit 103-2, a reproducing command, and the corresponding file name, the user interface 110-2 sends them to the control circuit 109. The control circuit 109 checks the operation condition of the video channel circuit 103-2 and when the video channel circuit 103-2 is not used, the control circuit 109 permits using the video channel circuit 103-2, that is, the control circuit 109 assigns the video channel circuit 103-2 to the user interface 110-2 and the control circuit 109.

Then, the control circuit 109 supplies the reproducing command and the file name to the filing circuit 107. In response to this the filing circuit 107 determines the second address of the disc unit 106 to read a frame of the video data from the disc unit 106 and supplies the second address, the recording command data to the access control circuit 108.

The command receiving circuit 201 in the access control circuit 108 receives the second address and the reproducing command and supplies the reproducing command and second address to the reproducing command register 203 and supplies the reproducing command and the second address to the reproducing command register 203. The reproducing command register 203 accumulates the reproducing command and the second address data. The command supplying circuit 205 checks the operation condition of the disc interface 105 and supplies one of the recording command firstly accumulated and the corresponding second address data and when the disc interface 105 is in a non-operating condition. In response to this the disc interface 105 reads the video data stored in the disc unit 106 with the second address from the access control circuit 108. If there is the accumulated reproducing command data in the reproducing command register 203, the disc interface continues reading the video data until there is no reproducing command data in the reading command register 203.

Figure 3A:
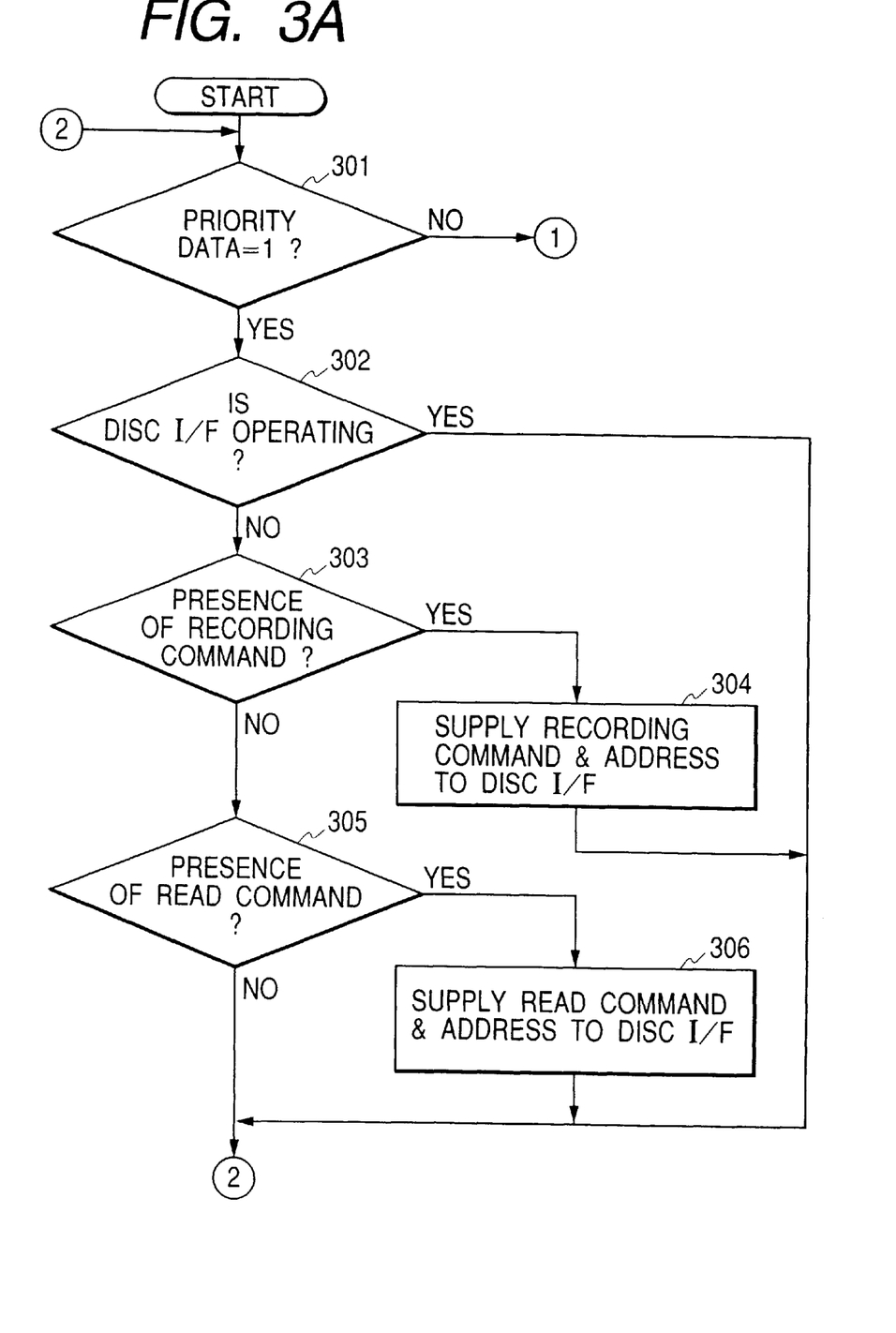
FIGS. 3A and 3B depict a flow chart showing recording and reproducing operations of the first embodiment.
Figure 3B:
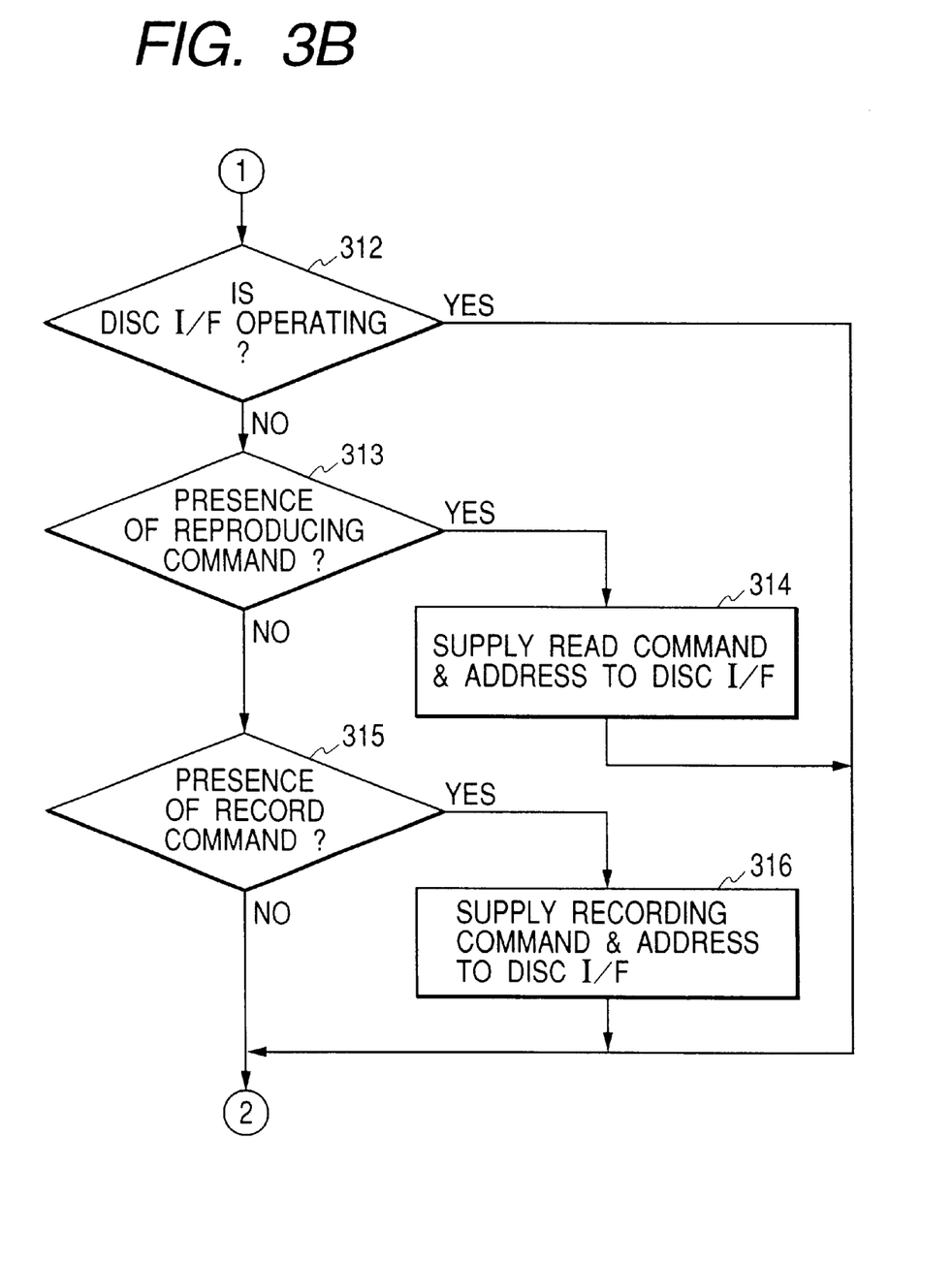

FIGS. 3A and 3B depict a flow chart showing the recording and reproducing operations of the first embodiment.

The command supplying circuit 205 checks whether the priority data 204 is "1" in step 301. If the priority data is "1", that is, the recording operation is effected with priority, the command supplying circuit 205 checks whether the disc interface 105 is in operating condition in step 302, if the disc interface is in the operating condition processing returns to step 301. If the disc interface 105 is in a non-operating condition, the command supplying circuit 205 checks whether there is recording command in the record command register 202. If there is recording command in the recording command register 202 in step 303, the command supplying circuit 205 supplies the recording command and the first address to the disc interface 105 in step 304 and processing returns to step 301. If there is no recording command in the record command register 202, the command supplying circuit 205 checks whether there is reproducing command in the reproducing command register 203 instep 305. If there is the reproducing command, the command supplying circuit 205 supplies the reproducing command and the second address to the disc interface 105 in step 306 and processing returns to sate 301. If there is no reproducing command in step 305, processing returns to step 301. As mentioned, the recording operation has a priority to the reproducing operation, so that the data rate of the recording operation is kept.

In step 301 if the priority data is not "1", that is, reproducing is effected with priority to the recording operation, the command supplying circuit 205 checks whether the disc interface 105 is in operating condition in step 312, if the disc interface 105 is in the operating condition processing returns to step 301. If the disc interface 105 is in the non-operating condition, the command supplying circuit 205 checks whether there is reproducing command in the reproducing command register in step 313. If there is reproducing command in the reproducing command register 203 in step 313, the command supplying circuit 205 supplies the reproducing command and second address to the disc interface 105 in step 314 and processing returns to step 301. If there is no reproducing command in the reproducing command register 203, the command supplying circuit 205 checks whether there is recording command in the record command register 202 in step 315. If there is the record command data, the command supplying circuit 205 supplies the recording command and the first address to the disc interface 105 in step 316 and processing returns to sate 301. If there is no reproducing command in step 315, processing returns to step 301.

When the disc interface 105 has completed storing the video data in the data buffer 104, the disc interface 105 informs the control circuit of the completion. In response to the control circuit 109 operates the video channel circuit 103 of the desired channel to reproduce and outputs the video data.

The user interface 110 can set the priority data to "0". If the priority data is "0" the access control circuit 108 outputs the reproducing command with priority to the recording command to keep the data rate in the reproducing operation.

Figure 4:
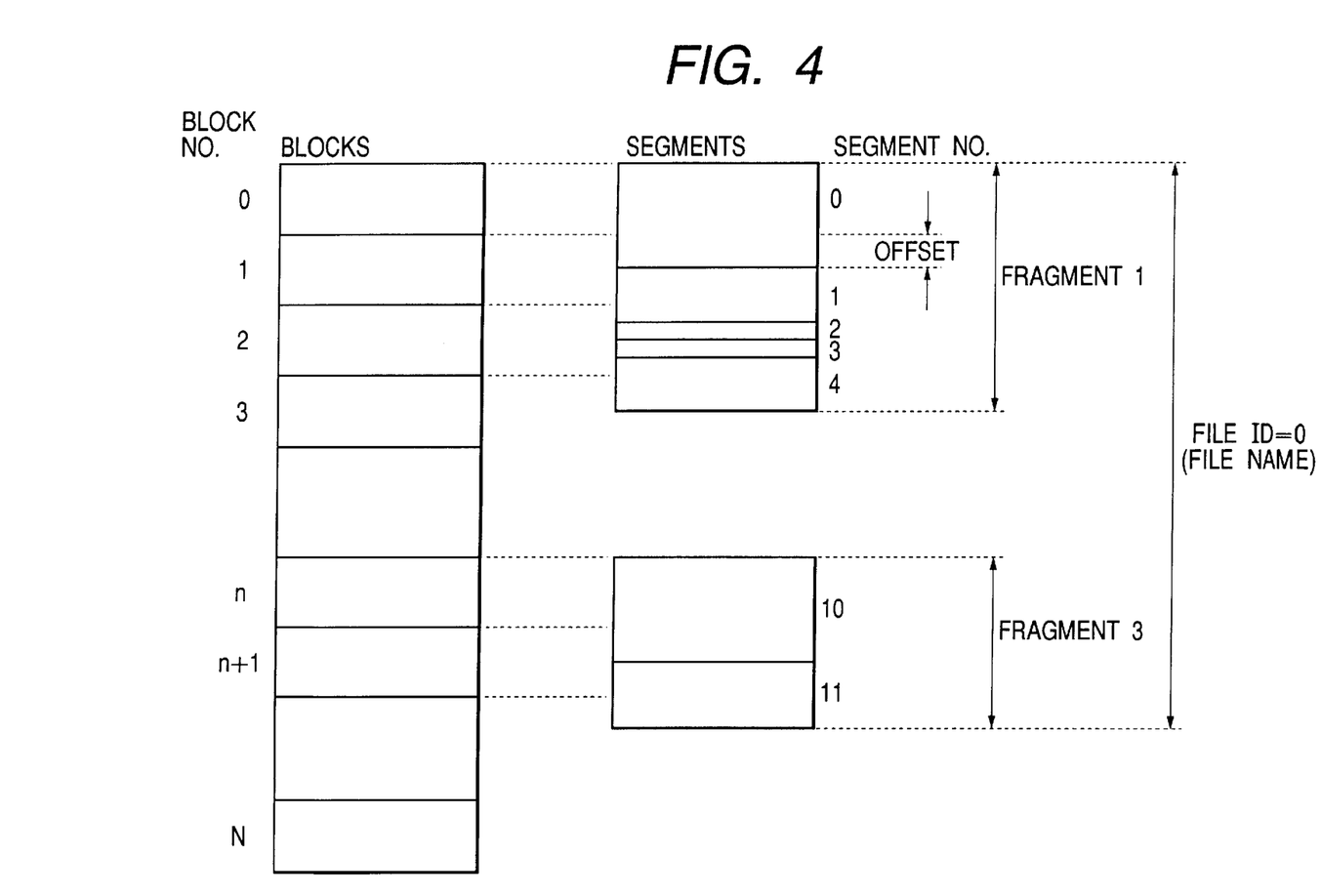
FIG. 4 is an illustration of the first embodiment showing a relation among the file name, fragments, segments, and blocks.
Figure 5A:
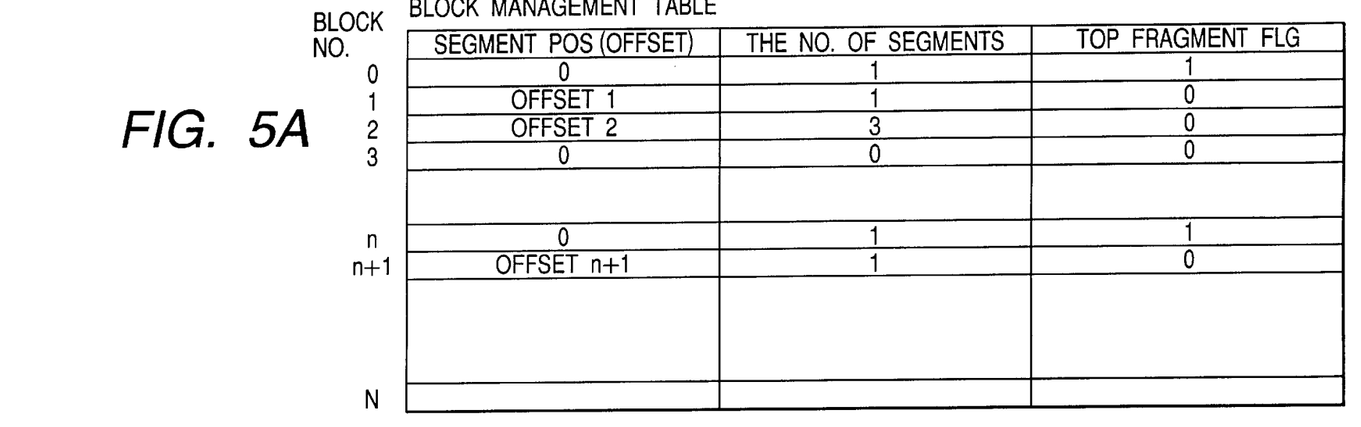
FIGS. 5A to 5E are illustrations of the first embodiment showing the data in the address control table shown in FIG. 1.
Figure 5B:
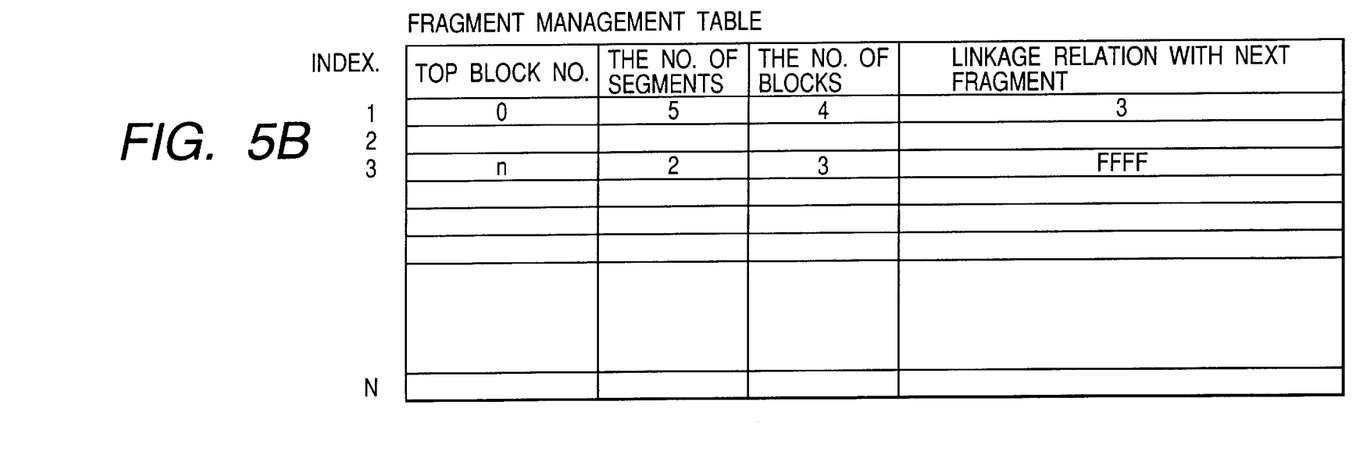
Figure 5C:
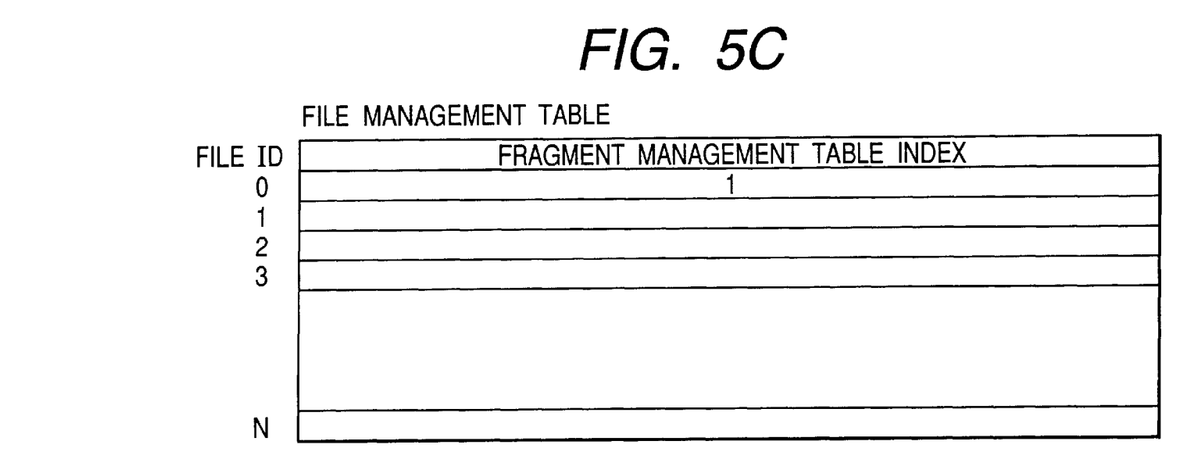
Figure 5D:
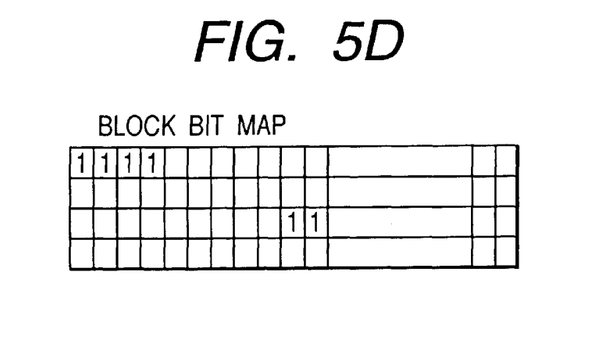
Figure 5E:
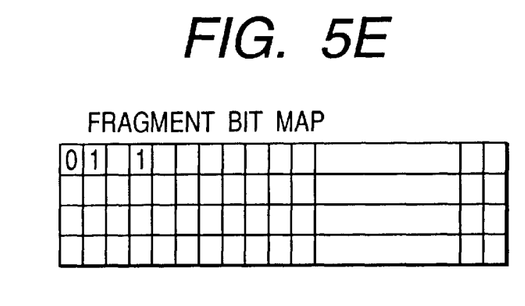

FIG. 4 is an illustration of the first embodiment showing a relation among the file ID (name), fragments, segments, and blocks.

The filing circuit 107 forms the files in the address control table 107a. A file includes a plurality of fragments, each fragment including a plurality of successive segments, each segment storing one frame of the video data and stores a table representing relations of the fragments forming the file, first address of the fragments forming the file, and the order (link relation) of the fragments forming the file in the address control table.

FIGS. 5A to 5E are illustration of the first embodiment showing the data in the address control table 107a. That is, the address control table 107a includes a block management table shown in FIG. 5A, a fragment management table shown in FIG. 5B, a file management table shown in FIG. 5C, a block bit map shown in FIG. 5D, and a fragment bit map 5E.

Figure 6A:
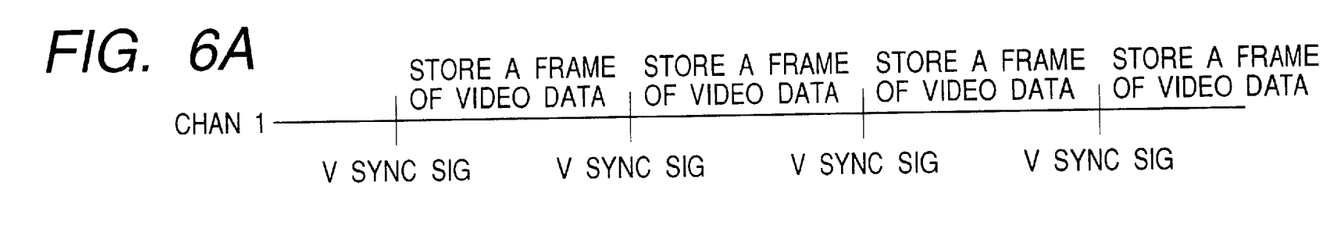
FIGS. 6A and 6B are time charts of the first embodiment showing the vertical synchronizing signals shown in FIG. 1.
Figure 6B:
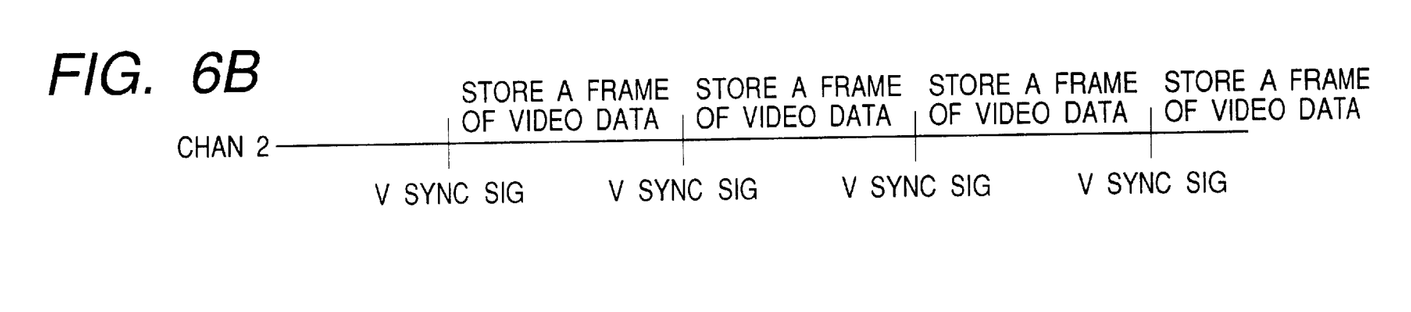

FIGS. 6A and 6B are time charts of the first embodiment showing the vertical synchronizing signals.

The synchronizing signal generation circuit 100 generates the vertical synchronizing signals of which phases are different each other. Therefore, the video signal input circuits 101-1 and 101-2 input the video data at the different vertical synchronizing timings as shown in FIGS. 6A and 6B, so that it is prevented that either of video signal of the channel 1 or the channel 2 cannot be inputted if the vertical synchronizing timings are the same or substantially the same.

The user interface 110 further receives an endless recording command and successively recording command which are sent to the filing circuit 107 through the control circuit 109. The filing circuit 107 determines the first address in response to the endless recording command such that the video data recurrently is overwritten at a predetermined number of the fragments and the filling circuit 107 determines the first address such that the video data successively recorded in response to the successively recording command.

(Second Embodiment)

Figure 7:
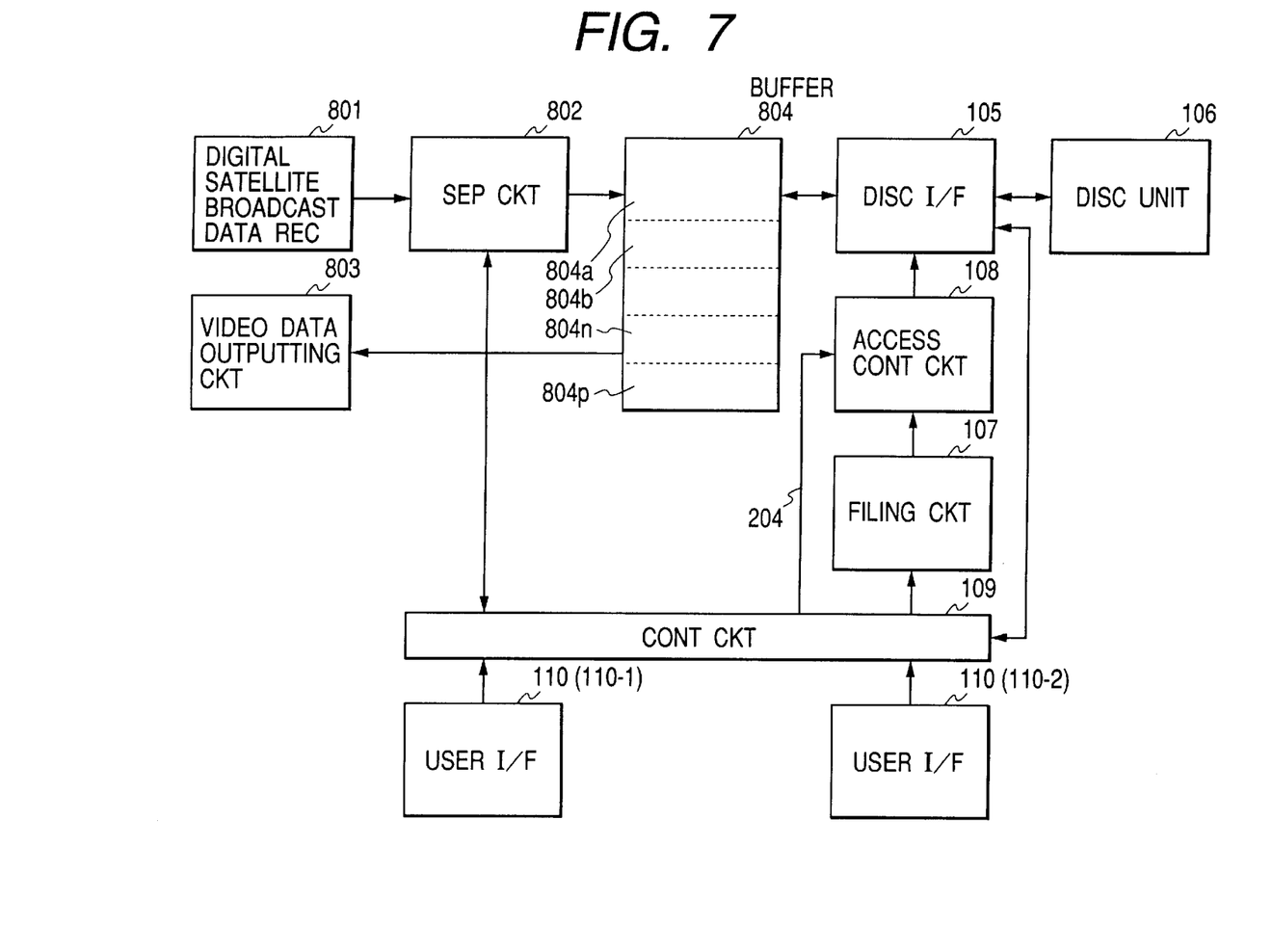
FIG. 7 is a block diagram of the multichannel recording and reproducing apparatus of a second embodiment.

FIG. 7 is a block diagram of the multichannel recording and reproducing apparatus of a second embodiment. The multichannel recording and reproducing apparatus of the second embodiment has substantially the same structure and the same operation as the first embodiment. The difference is that the video data is supplied from a digital satellite broadcast data receiver 801, a separation circuit 802, a buffer 804, and a video data outputting circuit 803 are provided instead the video data input circuits 101 and the video channel circuit 103 and the data buffer 104.

The digital satellite broadcast data receiver 801 receives digital satellite broadcast data including multiplexed multichannel video signals. The separation circuit 802 separates the multiplexed multichannel video signals from the digital satellite broadcast data receiver 801 into a plurality of channel of video data and the separated video data in the buffer 804 at different areas every channel in accordance with the request from the user interfaces 110.

When the user interface 110 receives a request for obtaining a channel and a recording command, and a file name, the control circuit sends the channel data to the separation circuit 802. The separation circuit 802 separates the multiplexed multichannel video data and stores separated video data in the buffer 804 at an storing area 804a as a channel 1. The control circuit 109 supplies the recording command data and the file name to the filing circuit 107 as similar to the first embodiment. The disc interface 105 stores the video data from the storing area 804a in the disc unit under control by the filing circuit 107 and the access control circuit 108 as similar to the first embodiment. If there are n requests for obtaining n channels of the video data, the video data from the separation circuit 802 is stored at the storing areas 804a to 804n respectively. The storing area 804p is used for the video data outputting circuit 803 of a fixed channel. The video data stored in the disc unit 106 is reproduced by inputting the file name with the user interface 110 and the video data is outputted at the video data outputting circuit 803.

What is claimed is:

1. A multichannel recording and reproducing apparatus comprising:

inputting and outputting means including N video channel circuits for inputting and outputting N video data, N being a natural number;

N data buffers for temporally storing said N video data from said N video channel circuits respectively;

memory means for receiving one channel of said N video data and storing said N video data;

memory interface means;

user interface means for receiving request channel data indicative of the use of one of said N video channel circuits, a recording command and a reproducing command, and a corresponding file name from a user;

control means for operating said one of said N video channel circuits in accordance with said request channel data and outputting said recording command, a reproducing command, said corresponding file name, and said request channel data from said user interface means;

filing means including a table for determining first address data corresponding to said file name from said control means in response to said recording command from said control means and storing a relation between said file name from said control means and said first address in said table to form a file and for determining second address data of said memory means using said file name from said control means and said stored relation in response to said reproducing command data; and access control means for accumulating said recording command and reproducing command, detecting an operation condition of said memory interface means, and successively supplying each of the accumulated recording command and reproducing command when said memory interface means is in a non-operating condition with priority provided to either of said recording command or reproducing command in accordance with priority data, wherein said memory interface means stores said one of said N video data from said data buffer in said memory means in response to said recording command, said first address data from said access control means, and said request channel data from said control means and reads and stores video data from said memory means in one of said N data buffers in response to said reading command from said access control means, said second address data from said access control means, and said request channel data from said control means to output said video data from said memory means through said inputting and outputting means.

2. A multichannel recording and reproducing apparatus as claimed in claim 1, wherein said filing means forms said file indicating fragments of said memory means, each fragment including successive segments, each segment storing one frame of said video data and has a table storing said first address of each of said fragments and each of said segments and a relation of between said file name and said fragments and a link relation of said fragments.

3. A multichannel recording and reproducing apparatus as claimed in claim 2, wherein said user interface further receives an endless recording command and a successively recording command and said filing means determines said first address in response to said endless recording command such that said video data recurrently is overwritten at a predetermined number of said fragments and said filling means determines said first address such that said video data successively recorded in response to said successively recording command.

4. A multichannel recording and reproducing apparatus as claimed in claim 1, further comprising synchronizing signal generation means for generating and supplying a plurality of vertical synchronizing signals of which phases are different each other, wherein said N video channel circuits are responsive to said a plurality of vertical synchronizing signals respectively.

5. A multichannel recording and reproducing apparatus as claimed in claim 1, wherein said user interface means includes a plurality of terminals and said control means assigns one of said N video channel circuits to one of a plurality of said terminals in response to said request channel data so that said one of said N video channel circuits is independently controlled by said each of a plurality of said terminals.

6. A multichannel recording and reproducing apparatus as claimed in claim 1, wherein said inputting and outputting means comprises a digital satellite broadcast data receiving means for receiving a digital satellite broadcasted data including multiplexed plurality of channels of video data and separation means for separating said digital satellite broadcasted data into a plurality of channels of video data and storing said plurality of said channels of video data in said data buffer means at different storing areas.

* * * * *